(12) United States Patent
Saloka et al.

(10) Patent No.: US 8,734,970 B2
(45) Date of Patent: May 27, 2014

(54) AUTOMOTIVE FUEL CELL WATER MANAGEMENT SYSTEM AND METHOD OF OPERATING SAME

(75) Inventors: George Steven Saloka, Dearborn, MI (US); Allen H. Meitzler, Ann Arbor, MI (US)

(73) Assignee: Ford Motor Company, Dearborn, MI (US)

( * ) Notice: Subject to any disclaimer, the term of this patent is extended or adjusted under 35 U.S.C. 154(b) by 1861 days.

(21) Appl. No.: 12/099,221

(22) Filed: Apr. 8, 2008

(65) Prior Publication Data

US 2009/0252998 A1     Oct. 8, 2009

(51) Int. Cl.
*H01M 8/04* (2006.01)
*H01M 8/02* (2006.01)

(52) U.S. Cl.
USPC .............................. 429/13; 429/413; 429/529

(58) Field of Classification Search
None
See application file for complete search history.

(56) References Cited

U.S. PATENT DOCUMENTS

| | | | |
|---|---|---|---|
| 6,117,579 A | 9/2000 | Gyoten et al. | |
| 6,259,971 B1 | 7/2001 | Mitchell et al. | |
| 6,893,755 B2 * | 5/2005 | Leboe | 429/411 |
| 6,936,361 B2 | 8/2005 | Kelley et al. | |
| 6,950,729 B2 | 9/2005 | Mitchell et al. | |
| 2005/0282047 A1* | 12/2005 | Kimura et al. | 429/4 |
| 2006/0240299 A1 | 10/2006 | Kanasugi | |

FOREIGN PATENT DOCUMENTS

JP     2002-184430     *     6/2002

* cited by examiner

*Primary Examiner* — A. Echelmeyer
(74) *Attorney, Agent, or Firm* — Damian Porcari; Brooks Kushman P.C.

(57) ABSTRACT

Actuators are attached with plates of a fuel cell stack. Electrical power is provided to the actuators to drive the actuators to mechanically excite the plates to agitate liquid water restricting or blocking flow fields formed in the plates.

16 Claims, 2 Drawing Sheets

AUTOMOTIVE FUEL CELL WATER MANAGEMENT SYSTEM AND METHOD OF OPERATING SAME

BACKGROUND

1. Field of the Invention

The invention relates to automotive fuel cell water management systems and methods of operating the same.

2. Discussion

An electrolyte fuel cell generates electricity by electrochemically reacting a fuel gas such as hydrogen and an oxidizer gas such as oxygen.

Some electrolyte fuel cells include a membrane comprising an electrolyte film and a catalytic layer formed on opposing surfaces of the electrolyte film. A gas-permeable and electrically conductive electrode layer is provided on an outer surface of each catalytic layer. An electrically conductive bipolar plate is provided on an outer surface of each of the electrode layers. The bipolar plates mechanically clamp the electrode layers and electrolyte film together.

A flow field or channel is formed on a surface of each bipolar plate facing the respective electrode layers. The flow fields direct gases to the electrode layers. The fuel gas is directed to one of the electrode layers. The oxidizer gas is directed to the other of the electrode layers.

During operation, hydrogen gas is taken in the electrode layer on a hydrogen gas supply side, e.g., anode, while passing along the surface of the electrode layer. The hydrogen gas diffuses and passes through the electrode layer to the anodic side catalytic layer. When the hydrogen gas inside the catalytic layer reaches a certain region, an electrochemical reaction takes place between the hydrogen gas and the electrolyte. The hydrogen gas is ionized by the reaction. The hydrogen ions are taken into the electrolyte film.

Oxygen gas is taken in the electrode layer on an oxygen gas supply side, e.g., cathode, while passing along the surface of the electrode layer. The oxygen gas diffuses and passes through the electrode layer to the cathodic side catalytic layer. The oxygen gas reacts with the hydrogen ions drifting from the anode through the electrolyte film producing water. During this reaction, electrons migrate from the anode to the cathode through an external load connected to the fuel cell anode and cathode thus generating electric power.

SUMMARY

An automotive fuel cell system includes a membrane electrode and a plate having a surface adjacent the membrane electrode. The surface has a flow field formed therein to deliver a fluid to the membrane electrode. The system also includes an actuator operatively connected with the plate. The actuator is configured to mechanically excite the plate to disperse liquid water within the flow field.

An automotive fuel cell system includes a plurality of fuel cells and a plurality of actuators. Each of the actuators is configured to mechanically excite one of the plurality of fuel cells to disperse liquid water within the one of the plurality of fuel cells.

A method of dispersing liquid water within an automotive fuel system includes providing electrical energy to at least one of a plurality of actuators, converting the electrical energy to mechanical energy and transferring the mechanical energy to at least one of a plurality of fuel cells to mechanically excite the at least one of the plurality of fuel cells to disperse liquid water within the at least one of the plurality of fuel cells.

While exemplary embodiments in accordance with the invention are illustrated and disclosed, such disclosure should not be construed to limit the claims. It is anticipated that various modifications and alternative designs may be made without departing from the scope of the invention.

DETAILED DESCRIPTION

Water vapor generated by electrochemical reactions on a cathodic side of a catalytic layer of a fuel cell may condense and deposit around the cathodic side catalytic layer and flow field. Condensed water that remains around the cathodic side catalytic layer and within the flow field may prevent oxygen gas from reaching the reaction area. This may affect the performance of the fuel cell.

Condensed water from the cathodic side catalytic layer may permeate through an electrolyte film and penetrate into an anodic side catalytic layer of the fuel cell. This water, as well as water vapor mixed with a fuel gas to hydrate the electrolyte film, may condense and deposit around the anodic side catalytic layer and flow field. Condensed water that remains around the anodic side catalytic layer and within the flow field may prevent hydrogen gas from reaching the reaction area. This may also affect the performance of the fuel cell.

Figure 1:
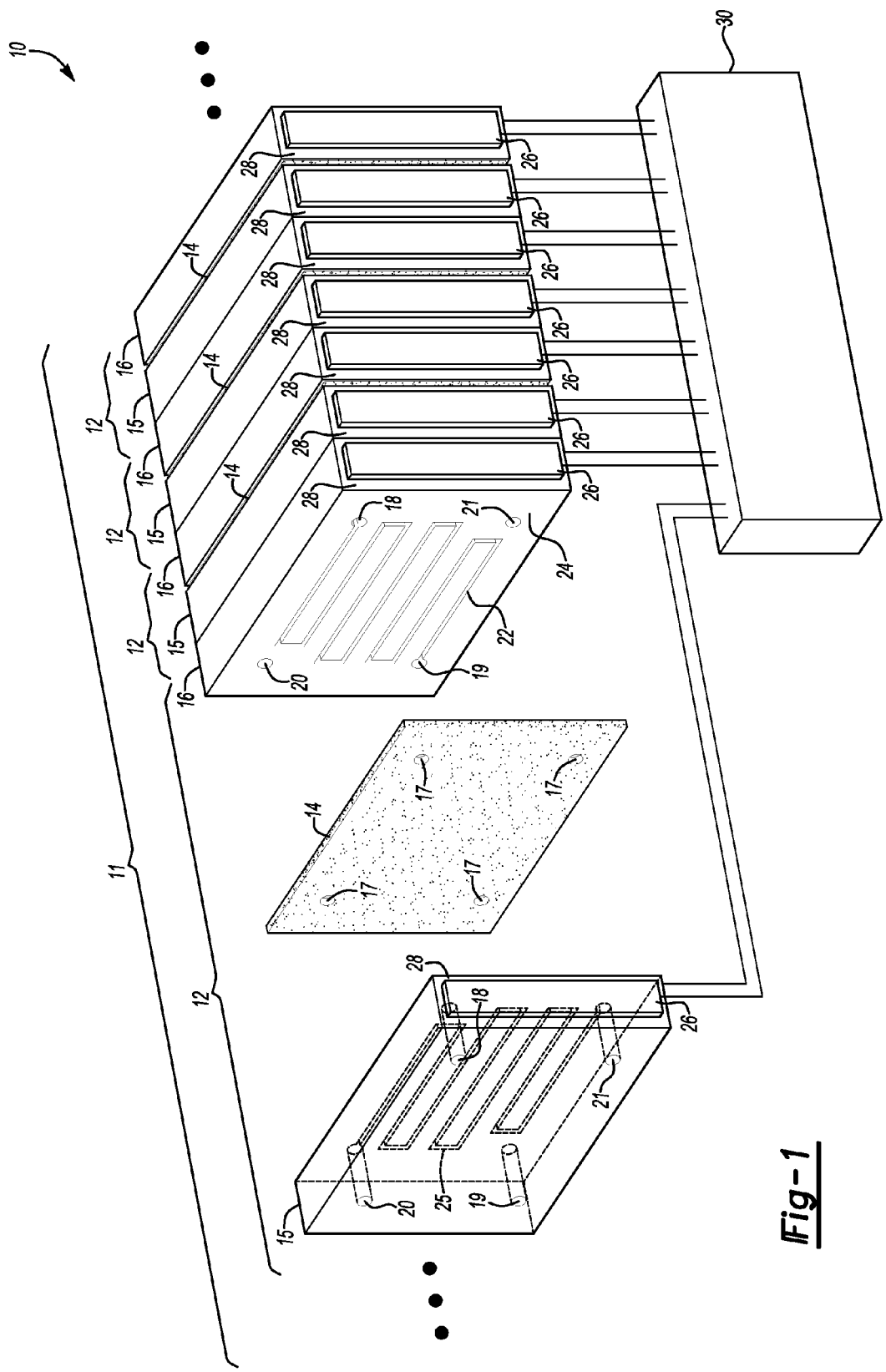
FIG. 1 is a perspective view, partially exploded, of a portion of an automotive fuel cell system according to an embodiment of the invention.

Referring now to FIG. 1, an embodiment of a portion of an automotive fuel cell system 10 includes a fuel cell stack 11. The fuel cell stack 11 includes a plurality of fuel cells 12. Each of the fuel cells 12 includes a membrane electrode 14 disposed between a pair of plates 15, 16, e.g., graphite, metallic, or composite plates.

As known in the art, each of the membrane electrodes 14 includes openings 17 that permit a fluid, e.g., hydrogen gas, air, etc., to pass through the membrane electrodes 14. Each of the plates 15, 16 includes a hydrogen inlet passageway 18, a hydrogen outlet passageway 19, an air inlet passageway 20 and an air outlet passageway 21. Each of the plates 16 includes a flow field 22, e.g., a channel, formed on a surface 24 adjacent its membrane electrode 14. The flow fields 22 fluidly communicate with the hydrogen inlet passageways 18 and the hydrogen outlet passageways 19 of the plates 16. Each of the plates 15 includes a flow field 25. The flow fields 25 fluidly communicate with the air inlet passageways 20 and the air outlet passageways 21 of the plates 15.

Hydrogen gas from a hydrogen supply line (not shown) passes through the hydrogen inlet passageways 18. The flow fields 22 of the plates 16 direct the hydrogen gas over the membrane electrodes 14 and to a hydrogen exhaust line (not shown) via the hydrogen outlet passageways 19. Similarly, air from an air supply line (not shown) passes through the air inlet passageways 20. The flow fields 25 of the plates 15 direct the air over the membrane electrodes 14 and to an air exhaust line (not shown) via the air outlet passageways 21.

In the embodiment of FIG. 1, a plurality of actuators 26, e.g., ceramic piezoelectric transducers, are adhered to respective external surfaces 28 of each of the plates 15, 16. In other embodiments, the actuators 26 may be attached, e.g., mechanically fastened, in any suitable fashion. As discussed below, the actuators 26 mechanically excite the plates 15, 16 to prevent liquid water from restricting or blocking the flow fields 22, 25.

Each of the fuel cells 12 and actuators 26 is electrically connected with an electronic control module 30. In the embodiment of FIG. 1, the control module 30 includes a function generator, power amplification circuitry, and a cell voltage monitoring array. Other configurations are of course also possible.

The cell voltage monitoring array of the control module 30 measures the respective operating cell voltages associated with each of the fuel cells 12. As recognized by those of ordinary skill, a drop in operating cell voltage by any one of the fuel cells 12 may be indicative of a water restricted/blocked flow field associated with that fuel cell 12.

The control module 30 selectively provides electrical power to drive the actuators 26. The function generator circuitry generates a sine wave that is amplified by the amplification circuitry. This amplified sine wave is selectively provided to the actuators 26. The actuators 26 convert this electrical energy to mechanical energy which excites, e.g., vibrates, the plates 15, 16. Water restricting or blocking the flow fields 22, 25 may disperse, e.g., move, vaporize, etc., depending on the frequency of the plate excitation.

The cell voltage monitoring array of the control module 30 indicates whether one of the fuel cells 12 is flooded when the operating cell voltage associated with that fuel cell 12 is less than the other fuel cells 12. In the embodiment of FIG. 1, the cell voltage monitoring array sends a signal to the function generator circuitry of the control module 30 to activate the actuators 26. Activating the actuators 26 vaporizes or sufficiently agitates the trapped water in the flooded fuel cell 12. As the trapped water is reduced, the hydrogen gas and/or oxygen gas is able to reach the reaction area. The operating cell voltage of the flooded fuel cell 12 increases as a result.

The frequency of electrical input to the actuators 26 may depend on design considerations such as the dimensions of the plates 15, 16 and the dimensions of the actuators 26.

The actuators 26 of the embodiment of FIG. 1 are PZT ceramic poled in the thickness direction. Each of the actuators 26 has a 0.1 inch thickness, 0.5 inch width and 4.0 inch length. Actuators of this size and shape typically have three main modes of vibration: a thickness dilatational mode at about 1.0 MHz, a width-longitudinal mode at about 50 kHz, and a length-longitudinal mode at about 10 kHz. The mode of vibration used in the embodiment of FIG. 1 is the width-longitudinal mode. This mode favors the propagation of a plate wave motion that can drive off water accumulated on plates 15, 16.

The longitudinal wave motion is symmetric with respect to central planes of the plates 15, 16. When operated under optimum conditions, the length-longitudinal mode is the lowest longitudinal mode of propagation supported by the plates 15, 16 and is at a frequency that results in vibration having a displacement component normal to a surface of the plates 15, 16 in which the flow fields 22, 25 are formed, e.g., the surface 24.

Driving the actuators 26 with an excitation sine wave with a frequency close to the width-longitudinal resonant frequency favors the transfer of mechanical energy from the actuators 26 to the lowest longitudinal mode of wave propagation in the plates 15, 16. At the optimal excitation frequency, the longitudinal wave motion in the plates 15, 16 can be resolved into two component shear waves traveling back and forth between the major faces of the plates 15, 16 and making an angle of 45 degrees relative to the length direction of the plates 15, 16. The normal vibration of the major surfaces of the plates 15, 16 favors the transfer of mechanical energy from the wave motion in the plates 15, 16 to liquids accumulated on the plates 15, 16 and in the flow fields 22, 25.

Figure 2:
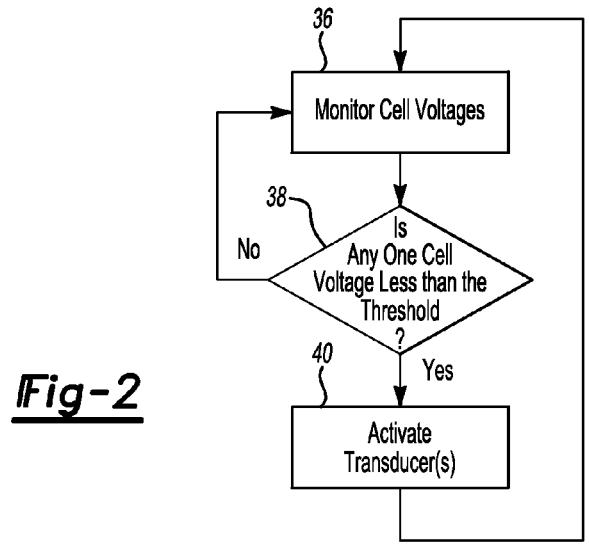
FIG. 2 is a flow chart of a control strategy for the fuel cell system of FIG. 1 according to another embodiment of the invention.

Referring now to FIGS. 1 and 2, the cell voltage monitoring array measures the operating cell voltages as indicated at 36. As indicated at 38, the cell voltage monitoring array determines if any of the operating cell voltages is less than a threshold, e.g., 300 mV for 15 seconds. If yes, the appropriate actuators 26 are activated as indicated at 40. If no, the cell voltage monitoring array returns to 36.

In other embodiments, electrical power may be provided to each of the actuators 26 at the same time, in sequence, or directed to a particular fuel cell 12 as dictated by the cell voltage monitoring array.

Figure 3:
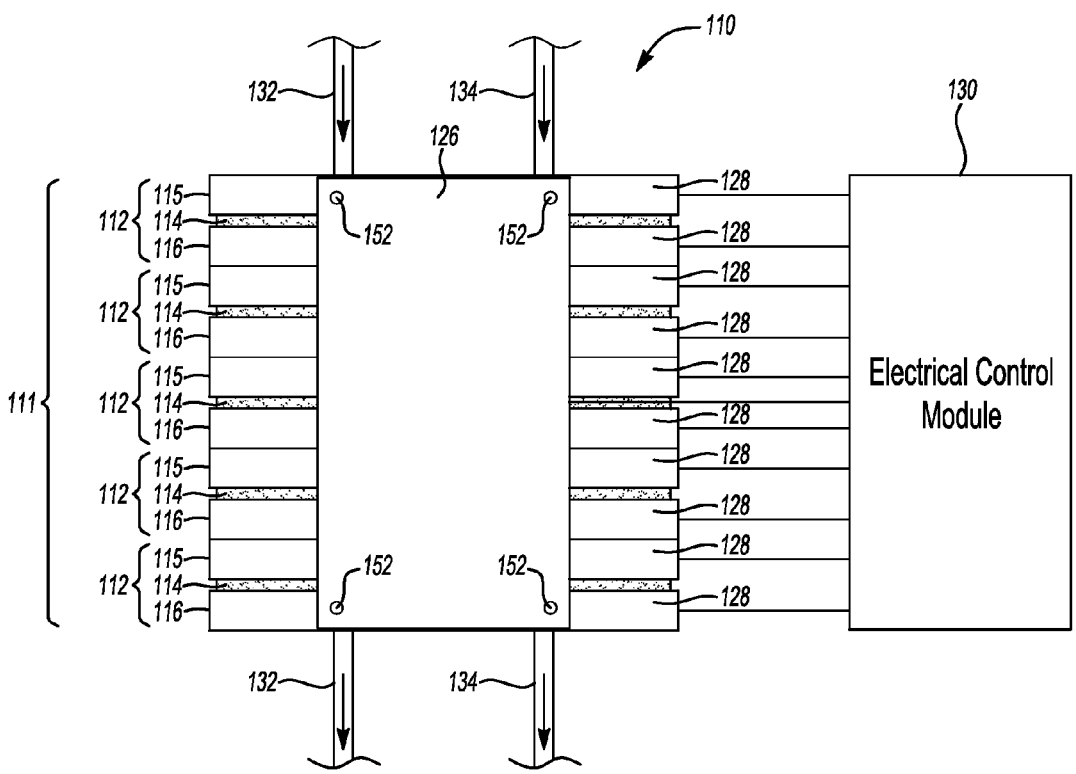
FIG. 3 is a schematic view of a portion of an automotive fuel cell system according to yet another embodiment of the invention.

Referring now to FIG. 3, another embodiment of a portion of an automotive fuel cell system 110 includes a fuel cell stack 111. The fuel cell stack 111 includes a plurality of fuel cells 112. Numbered elements of FIG. 3 that differ by 100 relative to numbered elements of FIG. 1 have similar, although not necessarily identical descriptions, to the numbered elements of FIG. 1. Each of the fuel cells 112 includes a membrane electrode 114 disposed between a pair of plates 115, 116. Each of the plates 115, 116 includes a flow field (not shown) similar to that discussed with reference to FIG. 1. The fuel cell system 110 further includes a hydrogen line 132 and an oxygen line 134 to, inter alia, provide hydrogen and oxygen to the fuel cell stack 111.

In the embodiment of FIG. 3, an actuator 126, is mechanically fastened to an outermost pair of plates 115, 116 at fastening points 152. In other embodiments, the actuator 126 may be bonded or otherwise attached to some or all of the fuel cells 112. The actuator 126 makes contact with respective edge faces 128 of each of the plates 115, 116 and is electrically connected with an electrical control module 130. The control module 130 selectively provides electrical power to drive the actuator 126 based on whether any operating cell voltages are less than expected. In other embodiments, particularly those that lack a cell voltage monitoring array, the control module 130 may periodically provide electrical power to drive the actuator 126. For example, the control module 130 may activate the actuator 126 every 15 minutes. Other configurations and control strategies are also possible. For example, a pressure across the fuel cell stack 111 may be monitored. A drop in pressure across the fuel cell stack 111 may indicate that at least one fuel cell 112 is flooded. The actuator 126 may then be activated accordingly.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A fuel cell system comprising:
 a membrane electrode;
 a plate having a surface adjacent the membrane electrode, the surface having a flow field formed therein to deliver a fluid to the membrane electrode;
 an actuator configured to mechanically excite the plate to disperse liquid water within the flow field; and
 an electronic control module configured to monitor a pressure associated with the flow field and to activate the actuator based on the pressure.

2. The system of claim 1 wherein the actuator is attached with the plate.

3. The system of claim 2 wherein the actuator is bonded with the plate.

4. The system of claim 1 wherein the actuator is a piezoelectric transducer.

5. The system of claim 1 wherein the actuator converts electrical energy to mechanical energy to mechanically excite the plate.

6. The system of claim 1 wherein dispersing the liquid water within the flow field includes vaporizing the liquid water within the flow field.

7. The system of claim 1 wherein mechanically exciting the plate includes vibrating the plate.

8. An automotive fuel cell system comprising:
   a plurality of fuel cells arranged to form a fuel cell stack; and
   a plurality of actuators each being configured to mechanically excite one of the plurality of fuel cells to disperse liquid water within the one of the plurality of fuel cells based on a pressure associated with the fuel cell stack.

9. The system of claim 8 further comprising an electronic control module configured to monitor the pressure associated with the fuel cell stack.

10. The system of claim 9 wherein the electronic control module is further configured to selectively activate the plurality of actuators.

11. The system of claim 10 wherein the control module sequentially activates the plurality of actuators.

12. The system of claim 10 wherein the control module periodically activates the plurality of actuators.

13. The system of claim 8 wherein each of the plurality of actuators is attached with one of the plurality of fuel cells.

14. The system of claim 8 wherein each of the plurality of actuators is bonded within one of the plurality of fuel cells.

15. The system of claim 8 wherein the plurality of actuators are piezoelectric transducers.

16. A method of dispersing liquid water within an automotive fuel cell comprising:
   providing electrical energy to an actuator operatively associated with the fuel cell based on a pressure associated with the fuel cell;
   converting the electrical energy to mechanical energy; and
   transferring the mechanical energy to the fuel cell to mechanically excite the fuel cell to disperse liquid water within the fuel cell.

* * * * *